S. G. FITZ SIMONS.
AUTOMOBILE FENDER.
APPLICATION FILED MAR. 9, 1922.
1,426,371.
Patented Aug. 22, 1922.
2 SHEETS—SHEET 1.
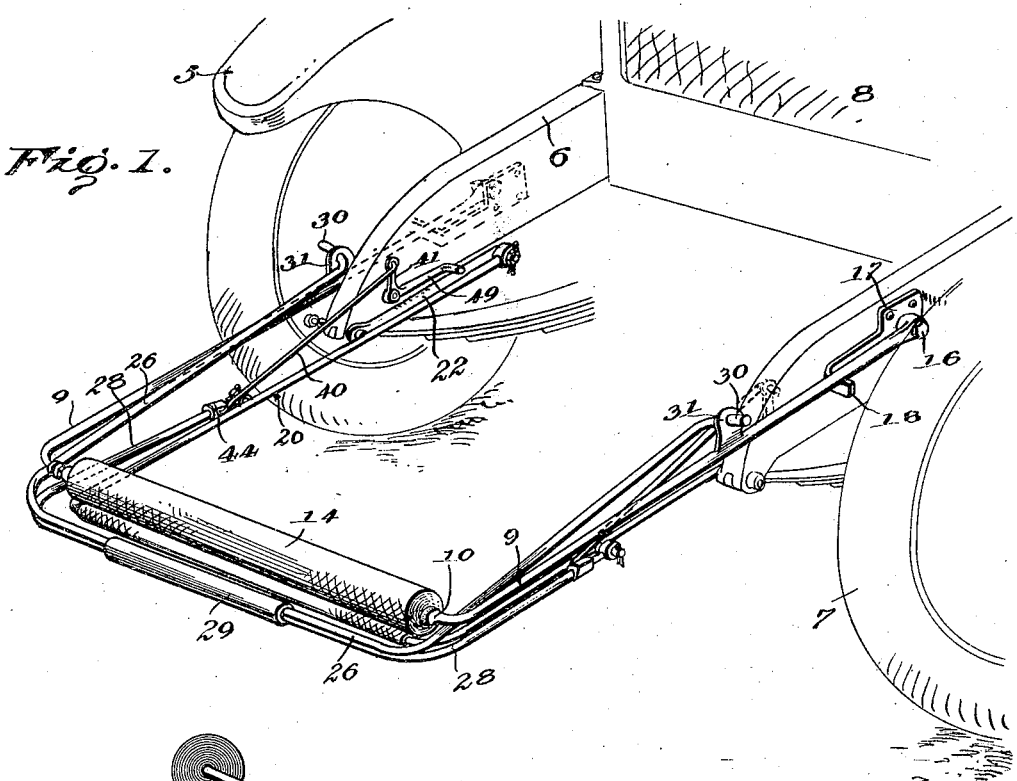
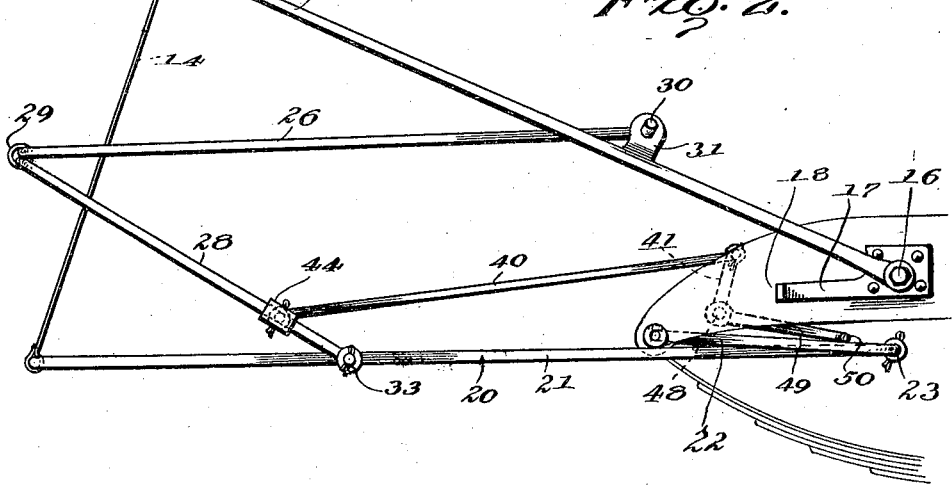
WITNESSES
INVENTOR
Samuel G. Fitz Simons.
BY
ATTORNEYS S. G. FITZ SIMONS.
AUTOMOBILE FENDER.
APPLICATION FILED MAR. 9, 1922.
1,426,371.
Patented Aug. 22, 1922.
2 SHEETS—SHEET 2.
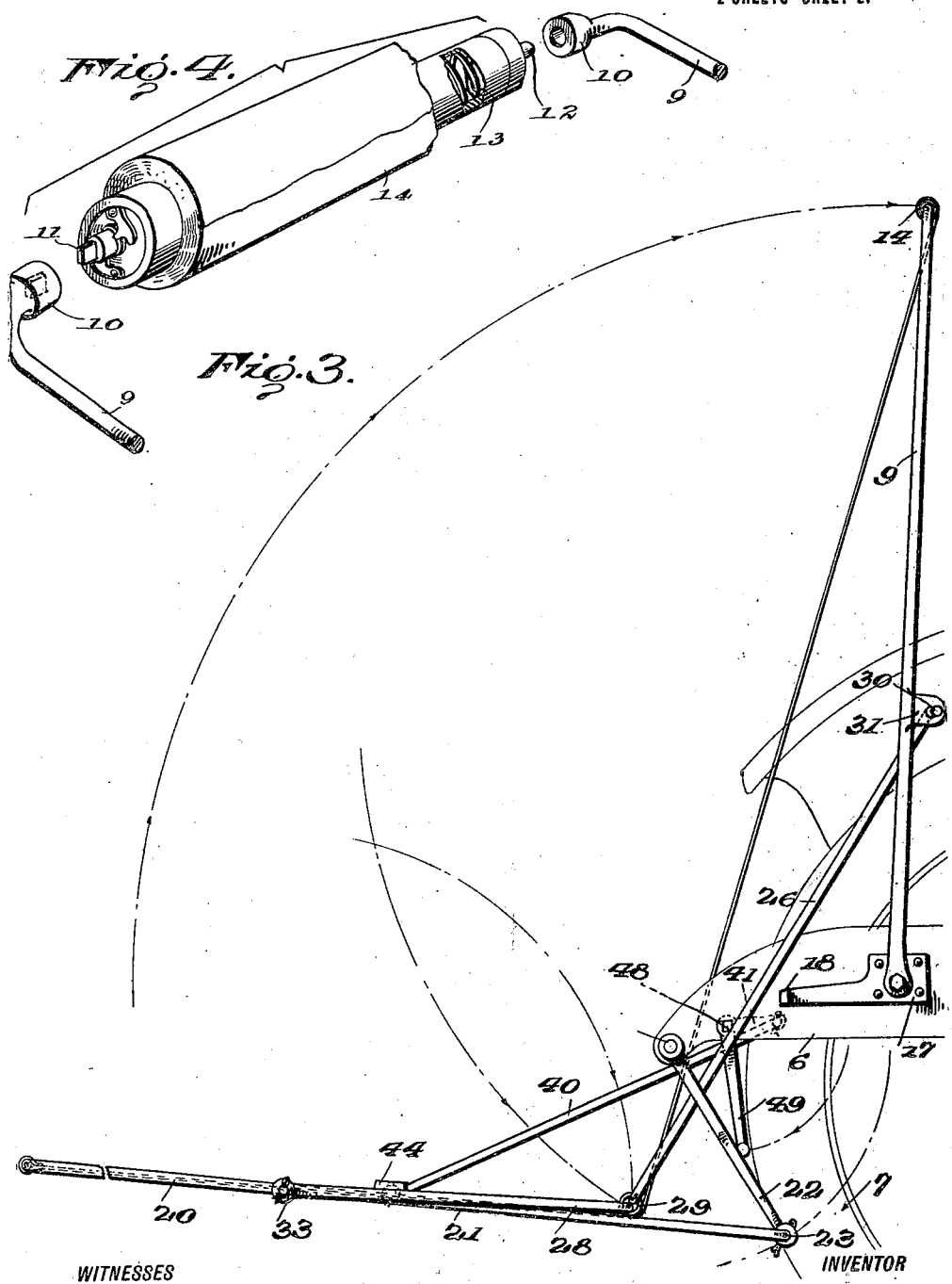

UNITED STATES PATENT OFFICE.

SAMUEL G. FITZ SIMONS, OF CHARLESTON, SOUTH CAROLINA.

AUTOMOBILE FENDER.

1,426,371.	Specification of Letters Patent.	Patented Aug. 22, 1922.

Application filed March 9, 1922. Serial No. 542,396.

*To all whom it may concern:*

Be it known that I, SAMUEL G. FITZ SIMONS, a citizen of the United States, and resident of Charleston, in the county of Charleston and State of South Carolina, have invented certain new and useful Improvements in Automobile Fenders, of which the following is a specification.

This invention relates to fenders especially adapted for application to motor vehicles.

An important object of this invention is to provide a motor vehicle fender which is normally held in a closed position and which upon striking a person in the path of travel of the automobile will then quickly open up and pick up the person, thereby saving the person from injury by being run over by the automobile.

Specifically the invention aims to provide simple means whereby the fender is opened up by the weight of a person struck, the opening of the fender also being accompanied by a forward movement of the lower curtain carrying member so that the fender will act as a scoop and thereby pick up the person struck.

A further object is to provide a fender which may be conveniently applied to a motor vehicle without altering the construction of the same or without marring the appearance of the vehicle.

A further object is to provide a fender which is simple to operate, of highly simplified construction and cheap to manufacture.

Other objects and advantages of the invention will be apparent during the course of the following description.

In the accompanying drawings forming a part of this application and in which like numerals are employed to designate like parts throughout the same, Figure 1 is a perspective of the improved fender applied.

Figure 2 is a side elevation of the same partly open.

Figure 3 is a side elevation of the fender completely open.

Figure 4 is a fragmentary perspective of the curtain carrying member and a portion of the curtain.

In the drawing wherein for the purpose of illustration is shown a preferred embodiment of the invention the numeral 5 generally designates a motor vehicle having the usual frame 6, the usual wheels 7 and a radiator 8 of any desired construction.

The invention forming the subject matter of this application is adapted to be connected to the spaced forwardly extending sides of the frame 6 and consists principally in a pair of spaced parallel curtain carrying arms 9 which as illustrated in Figure 4 have their forward terminal portions extended inwardly and formed with heads 10 having sockets for the reception of the squared and rounded ends 11 and 12 respectively of a spring roller 13.

A curtain 14 of canvas or other heavy fabric is wound about the spring roller 13 and forms a means for picking up a person struck by the motor vehicle and more particularly by the fender of the same.

With reference to Figure 1 it will be observed that the spring roller 13 and the curtain 14 extend across the greater portion of the front of the vehicle so that a person immediately in front of the vehicle will if struck by the vehicle be picked up and thereby saved from possible serious injury.

As illustrated in Figures 1 and 2 the rear portions of the curtain carrying arms 9 are pivoted to pivot bolts 16 extended laterally from brackets 17 secured to the forward portion of the frame 6. It will be seen that the brackets 17 of which there are two not only serve as a means for pivotally supporting the arms 9 but also as a means for limiting the downward movement of the same. The forward portions of the brackets 17 are extended angularly as indicated at 18 and are arranged in the path of travel of the arms 9 whereby to normally hold the arms in a substantially horizontal position.

One end of the curtain 14 is connected to the bight portion of a U-shaped curtain connecting arm 20 having rearwardly directed spaced parallel arms 21 pivoted to the lower portions of links 22 as indicated at 23.

Attention is directed to the fact that the roller 13 is similar to the roller of an ordinary window curtain and that the spring within the roller tends to wind the curtain 14. This spring tension on the curtain 14 pulls the same upwardly so that an upward movement is imparted to the U-shaped curtain attaching arm 20. Therefore the tension exerted by the roller 13 normally holds the U-shaped curtain attaching arm 20 in the approximately horizontal position illustrated in Figure 1 and prevents the arm from dropping to the ground.

The arms 9 and 20 which are associated directly with the curtain normally occupy an approximately horizontal position and come into play only when a person is struck by the fender. In that case the arms 9 and 20 are separated the arms 9 moving upwardly and the arm 20 moving downwardly to spread the curtain to form a pick-up device.

This action is brought about by upper and lower U-shaped bumper members 26 and 28 which as illustrated in Figure 1 have their bight portions joined by a sleeve 29. It will be seen that the sleeve 29 encircles the bight portions of the U-shaped bumper members 26 and 28 so that the same are caused to move rearwardly together. Also the sleeve 29 may be of a cushioning material so as to make the blow as light as possible. It is understood, of course, that the bight portions of the U-shaped members 26 and 28 are normally arranged in advance of the curtain and the arms 9 and 20 and that the bight portions of the bumper members are the first to strike the person in the path of travel of the automobile.

When a person is struck by the cushioning member 29 the bumper members 26 and 28 are moved rearwardly and consequently the curtain supporting and carrying arms 9 and 20 are separated for spreading out the curtain.

The arms of the upper U-shaped bumper member 26 have their rear terminal portions extended laterally as indicated at 30 and pivotally connected to apertured ears 31 extended upwardly from the pair of parallel curtain supporting arms 9. As the rear portions of the arms of the U-shaped bumper member are pivotally connected to the curtain supporting arms 9 the rearward movement of the bumper member will cause the curtain supporting arms 9 to move upwardly.

As illustrated in Figure 2 the spaced parallel arms of the lower U-shaped bumper member 28 are pivoted as indicated at 33 to the intermediate portions of the U-shaped curtain attaching arm 20 so that the rearward movement of the U-shaped bumper member 28 will result in the downward movement of the curtain attaching member 20.

With reference to the foregoing description it will be seen that when the bumper member 29 strikes a person the parts 26 and 28 will move rearwardly so as to separate the curtain carrying arms 9 and 20. The separation of the members 9 and 20 results in spreading the curtain 14 so as to form in effect a scoop to pick up the person struck.

However when the lower U-shaped bumper member 28 reaches an approximately horizontal position the continued weight of the person struck will move the same downwardly and forwardly so that the lower U-shaped curtain attaching arm 20 is moved forwardly. This forward movement of the lower U-shaped curtain attaching arm 20 causes the curtain to act somewhat as a scoop and to pick up the person struck. Figure 3 illustrates that the U-shaped bumper 28 moves downwardly and forwardly upon passing a vertical position and this figure also illustrates that the bight portions of the bumper members 26 and 28 and more specifically the sleeve 29 contacts with the intermediate portion of the curtain so as to hold it taut and to hold the lower portion of the curtain in the plane of the U-shaped curtain attaching arm 20. This is an important feature as it prevents sagging of the curtain.

Additional means in the nature of a pair of links 40 and a pair of bell-cranks 41 are provided for assuring the downward and forward movement of the lower U-shaped curtain attaching arm 20 when the fender strikes a person. With reference to Figure 2 in particular it will be seen that the forward portions of the links 40 are provided with collars 44 slidable on the spaced parallel arms of the U-shaped bumper member 28. The rear portions of the links are connected to the branches of the bell-cranks 41 which are pivotally connected at the juncture of their branches to the frame as indicated at 48. The bell-cranks 41 are provided with rearwardly directed branches 49 having laterally directed portions 50 which engage the links 22 and thereby move the same downwardly when the U-shaped bumper member 29 is moved rearwardly. This positively causes the lower U-shaped curtain attaching arm 20 to move downwardly and forwardly to cause the curtain to effectively pick up the person struck.

In operation the fender normally occupies the position illustrated in Figure 1 wherein it is shown that the bight portions of the bumper members 26 and 28 are normally located in advance of the rolled curtain and the U-shaped curtain attaching arm 20 so that the sleeve member 29 will be the first to contact with the person struck by the bumper. When the U-shaped members 26 and 28 are forced rearwardly by striking a person the curtain supporting arms 9 are moved upwardly and the U-shaped curtain attaching arm 20 is moved downwardly thereby to spread the curtain 14. The continued rearward movement of the members 26 and 28 causes the lower member 29 to assume an approximately vertical position whereupon it changes its direction of travel and moves downwardly and forwardly to assume the position illustrated in Figure 3. Likewise the upper U-shaped bumper member 26 is swung downwardly and the sleeve 29 is forcibly engaged with the curtain so as to hold the same taut. As the arms 9 and 20 separate as illustrated in Figure 2 the bell-cranks 41 of which there are two are swung about the pivot elements 48 so that the lower U-shaped curtain attaching arm 20 is swung downwardly and forwardly so as to scoop up the person struck.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what is claimed is:—

1. A vehicle fender comprising a curtain, an arm connected thereto, a link for connecting the arm to a vehicle, a bumper movably arranged in advance of said curtain, and a bell crank having connection with said bumper and having a branch engaged with said link for forcing the same downwardly when the bumper is actuated.

2. A vehicle fender comprising a curtain, an arm connected thereto, a link for connecting the arm to a vehicle, a bumper movably arranged in advance of said curtain, a bell crank having connection with said bumper and having a branch engaged with said link for forcing the same downwardly when the bumper is actuated, and a curtain supporting member having rollers about which the curtain is trained.

3. A fender for motor vehicles comprising a pair of curtain supporting arms having means whereby the same may be pivotally connected to a motor vehicle, a roller connected to said arms, a curtain connected to said roller, a U-shaped curtain attaching arm connected to said curtain and having means whereby the same may be movably and pivotally connected to a motor vehicle, and a bumper member normally arranged in advance of said first and second named arms and connected to the same whereby to move the arms in opposite directions when the bumper member encounters an obstacle.

4. A fender for motor vehicles comprising a pair of curtain supporting arms having means whereby the same may be pivotally connected to a motor vehicle, a roller connected to said arms, a curtain connected to said roller, a U-shaped curtain attaching arm connected to said curtain and having means whereby the same may be movably and pivotally connected to a motor vehicle, a bumper member normally arranged in advance of said arms and connected to the same whereby to move the arms in opposite directions when the bumper member encounters an obstacle, and brackets limiting the downward movement of the curtain supporting arms.

5. A fender for motor vehicles comprising a pair of curtain supporting arms, a spring roller connected to said curtain supporting arms, a curtain trained about said roller, a curtain attaching arm connected to one end of said curtain, pairs of links adapted for pivotal connection with the vehicle and having pivotal connection to said curtain attaching arm, and upper and lower bumper members pivotally connected to said first and second named arms and normally disposed in advance of said curtain whereby to form a striking element.

6. A fender for motor vehicles comprising a pair of curtain supporting arms having means whereby the same may be pivotally connected to a motor vehicle, a roller connected to said curtain supporting arms, a curtain trained about said roller, a curtain attaching arm connected to one end of said curtain, pairs of links adapted for pivotal connection with the vehicle and having pivotal connection to said curtain attaching arm, upper and lower bumper members pivotally connected to said first and second named arms and normally disposed in advance of said curtain whereby to form a striking element, and a sleeve connecting said upper and lower bumper members for movement together.

7. A fender for motor vehicles comprising a pair of curtain supporting arms, a spring roller connected to said curtain supporting arms, a curtain trained about said roller, a U-shaped curtain attaching arm having a bight portion connected to one end of said curtain, pairs of links adapted for pivotal connection with the vehicle and having pivotal connection to said U-shaped curtain attaching arm, upper and lower bumper members pivotally connected to said first and second named arms and normally disposed in advance of said curtain whereby to form a striking element, a sleeve connecting said upper and lower bumper members for movement together, said sleeve being of a cushioning material.

8. A fender for motor vehicles comprising a pair of curtain supporting arms having means whereby the same may be pivotally connected to a motor vehicle, a spring roller connected to said curtain supporting arms, a curtain trained about said roller, a U-shaped curtain attaching arm having a bight portion connected to said curtain, upper and lower bumper members pivotally connected to said first and second named arms and normally disposed in advance of said curtain whereby to form a striking element, a sleeve connecting said upper and lower bumper members for movement together, the spring in said roller forming a means for normally holding the U-shaped curtain attaching arm in a horizontal position.

9. A fender for motor vehicles comprising a roller, a supporting member for the roller, a curtain trained about the roller, a U-shaped curtain attaching arm connected to said curtain, a U-shaped bumper member pivoted to said U-shaped curtain attaching arm and having a bight portion normally disposed in advance of the curtain, a pair of links having collars slidably connected to said bumper member, bell-cranks connected to said links and adapted for moving said U-shaped curtain attaching arm downwardly as the curtain is spread, and links pivotally supporting said U-shaped curtain attaching arm.

10. A fender for motor vehicles comprising a plurality of curtain supporting arms, a spring roller carried thereby, a curtain trained about said roller, a U-shaped curtain attaching arm having a bight portion connected to said curtain, links connected to said U-shaped curtain attaching arm, U-shaped bumper members having bight portions extending in advance of the curtain, a sleeve connecting the bight portions of said bumper members, and means whereby to limit the downward movement of said curtain supporting arms.

11. A fender for motor vehicles comprising a pair of curtain supporting arms having means whereby the same may be pivotally connected to a motor vehicle, a spring roller connected to said arms, a curtain trained about said spring roller, a U-shaped curtain attaching arm having a bight portion to which said curtain is connected, a pair of links pivoted to the vehicle and to the rear portion of said U-shaped curtain attaching arm, upper and lower U-shaped bumping members having bight portions extending in advance of the curtain, a sleeve connecting the bight portions of said upper and lower bumper members, the rear portion of said U-shaped bumper member being connected to said curtain supporting arms, the rear portions of said lower bumper members being pivoted to the intermediate portion of said U-shaped curtain attaching arm, links slidably and pivotally connected to said lower U-shaped bumper member, bell cranks having pivotal connection to said links, said bell cranks being provided with branches formed with laterally directed lugs engaging said first named links whereby to move the same downwardly and forwardly when the bumper members are moved rearwardly, and means to limit the downward movement of said curtain supporting arms.

SAMUEL G. FITZ SIMONS.